United States Patent [19]

Kato et al.

[11] Patent Number: 5,582,782
[45] Date of Patent: Dec. 10, 1996

[54] METHOD OF STOPPING A DIE OF AN INJECTION MOLDING MACHINE AND A DIE CLAMPING APPARATUS

[76] Inventors: Kazuo Kato, 1411 River Chase Trail, Duluth, Ga. 30136; Yoshihiko Taniyama, 9380 Old Southwick Pass, Alpharetta, Ga. 30202; Naoji Arai, 365-115, Konakadaicho, Inage-ku, Chiba-shi, Chiba 263, Japan

[21] Appl. No.: 396,648

[22] Filed: Mar. 1, 1995

[51] Int. Cl.⁶ ........................................... B29C 45/00
[52] U.S. Cl. .................. 264/40.1; 264/40.5; 264/328.1; 425/150; 425/450.1; 425/589
[58] Field of Search ................................. 264/40.1, 40.5, 264/40.7, 328.1; 425/150, 450.1, 589

[56] References Cited

U.S. PATENT DOCUMENTS

| | | | |
|---|---|---|---|
| 4,131,596 | 12/1978 | Allen | 264/40.5 |
| 4,281,977 | 8/1981 | Farrell | 425/149 |
| 4,301,100 | 11/1981 | Farrell | 264/40.5 |
| 4,696,632 | 9/1987 | Inaba | 425/150 |
| 4,726,920 | 2/1988 | Yokota | 264/40.5 |
| 4,741,685 | 5/1988 | Inaba et al. | 425/145 |
| 4,846,654 | 7/1989 | Neko | 425/150 |
| 4,966,738 | 10/1990 | Inaba et al. | 264/40.5 |
| 5,059,365 | 10/1991 | Hertzer et al. | 264/40.5 |

FOREIGN PATENT DOCUMENTS 61-205111  9/1986  Japan .
62-068725  3/1987  Japan .

*Primary Examiner*—Jill Warden
*Assistant Examiner*—Harold Y. Pyon
*Attorney, Agent, or Firm*—Armstrong, Westerman, Hattori, McLeland & Naughton

[57] ABSTRACT

An injection molding machine has a die clamping apparatus which effects die closing, die clamping and die opening. A die open-side stop position can be accurately set without using any restricting mechanism such as a mechanical stopper and a position setting device. In addition to the die open-side stop position, a die opening operation stop position is set at a position offset by a preset amount from the die open-side stop position in a clamping direction. A deceleration start position is also set at a position offset by a preset amount from the die opening operation stop position in the clamping direction. When the movable die reaches the deceleration start position, a setting value of die opening speed is lowered. When the movable die reaches the die opening operation stop position, the operation for die opening is stopped so as to stop the movable die. The die opening operation stop position is changed in accordance with a difference between the actual stop position of the movable die and the die open-side stop position.

3 Claims, 6 Drawing Sheets

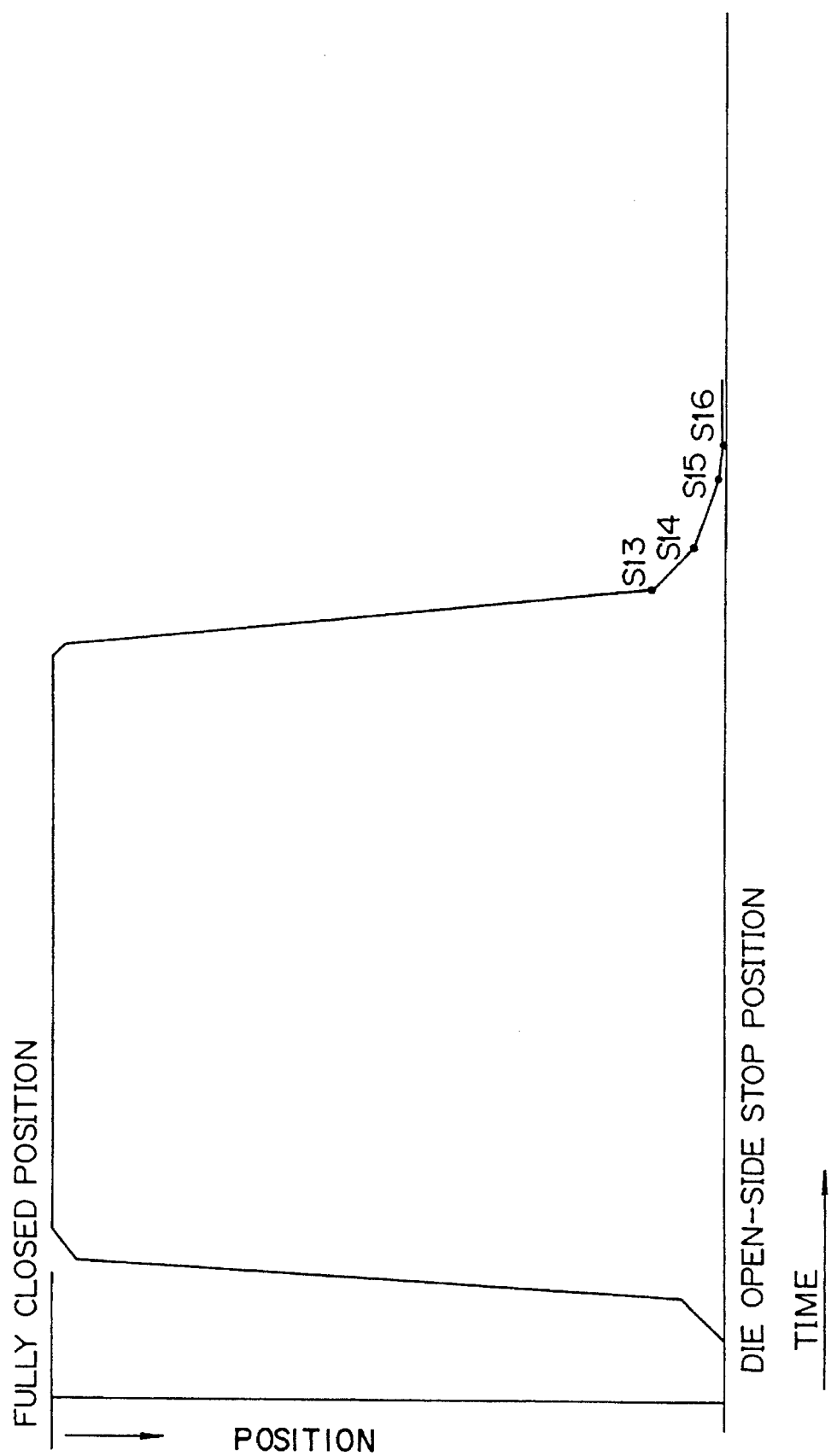

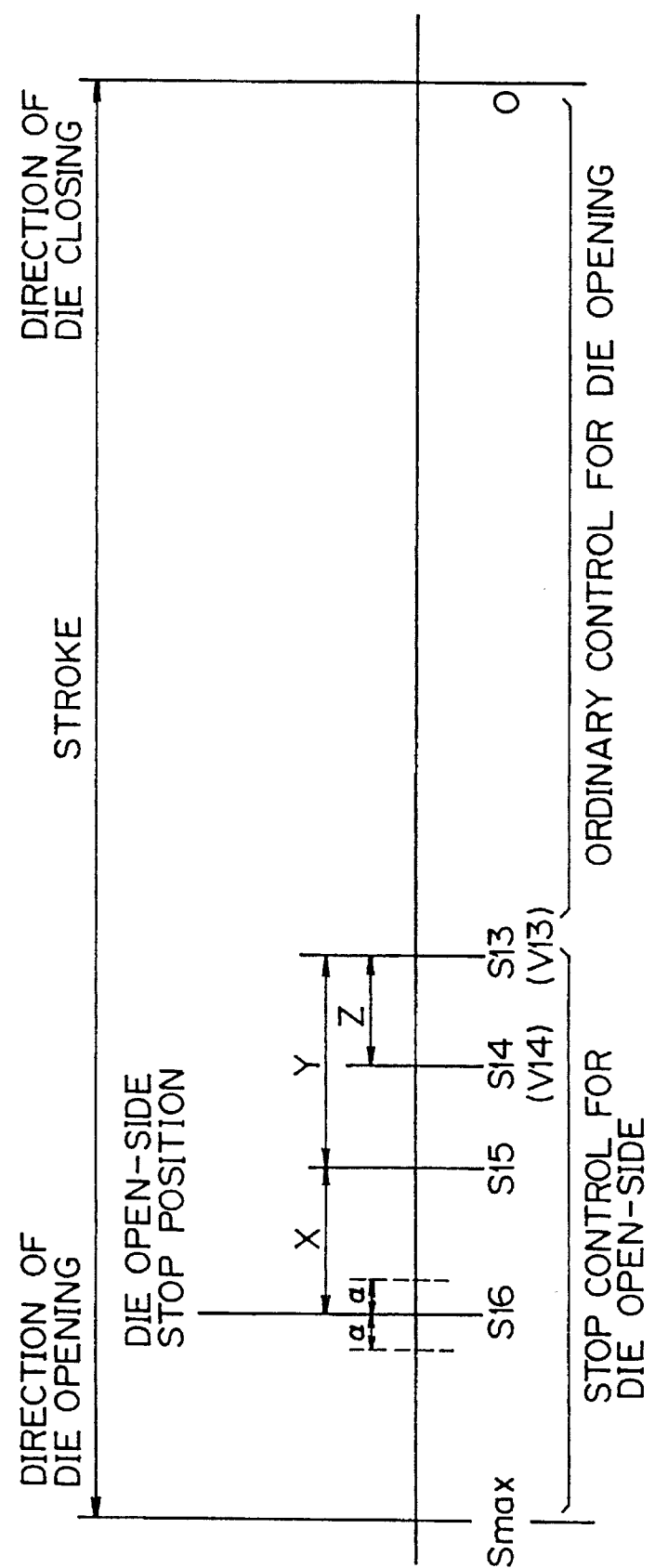

METHOD OF STOPPING A DIE OF AN INJECTION MOLDING MACHINE AND A DIE CLAMPING APPARATUS

BACKGROUND OF THE INVENTION

1. Field of the Invention

The present invention relates to a method of stopping a movable die of an injection molding machine at its open side and to a die clamping apparatus.

2. Description of the Related Art

In a conventional injection molding machine, a resin heated and melted by a heating cylinder is charged into a cavity in a die. The molten resin is then cooled to obtain a molded product, which is taken out after opening the die.

The die is composed of a stationary die and a movable die which is disposed facing the stationary die and is guided for advancing and retracting movement. Die closing is effected by advancing the movable die and die clamping is effected by pressing the movable die against the stationary die, while die opening is effected by retracting the movable die. For this purpose, a die clamping apparatus is provided in the injection molding machine. The die clamping apparatus is composed of a stationary platen carrying the stationary die, a toggle support, a movable platen carrying the movable die, and a toggle mechanism for advancing and retracting the movable platen. The toggle support is supported by the stationary platen via tie bars, and the toggle mechanism is disposed between the movable platen and the toggle support. Accordingly, when the toggle mechanism is operated, the movable die is moved along the tie bars.

Also, a die clamping cylinder is disposed to operate the toggle mechanism. The die clamping cylinder comprises a piston so that fluid chambers are formed on both sides of the piston. By supplying the fluid chambers with working fluid, the piston is advanced to operate the toggle mechanism such that die closing and die clamping are successively effected, or the piston is retracted to reversely operate the toggle mechanism such that die opening is effected.

A mechanical stopper (stop position setting device) is provided in the clamping cylinder to restrict retracting movement of the piston. The mechanical stopper is used to set the most retracted position of the movable platen within the movable stroke (hereinafter referred to as a "die open-side stop position"). The movable platen is therefore stopped at the "die open-side stop position" during a retracting movement for die opening. The mechanical stopper also secures the accuracy of the stopping operation.

FIG. 1 is a sectional view of a conventional die clamping cylinder.

As shown in FIG. 1, a piston 12 is slidably received in a tubular die clamping cylinder 11 so that a pair of fluid chambers 13 and 14 are formed on the rear and front sides (the left and right sides as viewed in FIG. 1) of the piston 12. The fluid chambers 13 and 14 are provided with respective ports 16 and 17 through which working fluid is supplied to the fluid chambers 13 and 14. Also, a piston rod 18 is integrally formed with the piston 12, and an unillustrated toggle mechanism is connected to the piston rod 18.

Accordingly, when the piston 12 is advanced (to the right in FIG. 1) by supplying working fluid to the fluid chamber 13 through the port 16, the toggle mechanism is operated so that an unillustrated movable platen is advanced for die closing and die clamping. Also, when the piston 12 is retracted (to the left in FIG. 1) by supplying working fluid to the fluid chamber 14 through the port 17, the toggle mechanism is operated so that the movable platen is retracted for die opening.

A mechanical stopper 22 is disposed in the die clamping cylinder 11 at its left end as viewed in FIG. 1 so as to set a die open-side stop position where the movable platen is stopped during the retracting movement for die opening, and to guarantee the accuracy of the stopped position. The mechanical stopper 22 is composed of a tubular member having a female screw on its inner surface and an adjusting member is disposed therein. The adjusting member 23 having a male screw on its outer surface is screw-engaged with the mechanical stopper 22.

A handle 24 is attached to the adjusting member 23 at its rear end (at its left end as viewed in FIG. 1), which allows an operator to operate the handle 24 so as to rotate the adjusting member 23. A guide groove 26 extending in the axial direction of the cylinder 11 is formed in the outer surface of the mechanical stopper 22, and a pin 27 is engaged with the guide groove 26 for prohibiting rotational movement of the mechanical stopper 22. Accordingly, when the adjusting member 23 is rotated by operating the handle 24, the mechanical stopper 22 is reciprocated in the axial direction.

The mechanical stopper 22 has a front end surface (a right end surface as viewed in FIG. 1) which can be contacted with an abutting surface 29 of the piston 12. The mechanical stopper 22 is used to set the above-described die open-side stop position, i.e., the stroke end of the piston 12 during die opening, by restricting movement of the piston.

However it is necessary to rotate the adjusting member 23 by operating the handle for moving the mechanical stopper 22 when an operator tries to change the setting of the die open-side stop position.

And also to set the die open-side stop position automatically a motor, a feed mechanism, and the like must to be used, making the structure of the clamping apparatus complicated.

Moreover, if the die open-side stop position is set without the mechanical stopper 22 and a die opening speed is increased for shortening a molding cycle, the movable die would overrun after the die opening.

As a result it is possible to prevent the stop position of the movable die from varying in each molding cycle. So it is impossible to take out a molded product automatically by a device for taking out a molded product.

SUMMARY OF THE INVENTION

An object of the present invention is to provide an improved method of stopping a die of an injection molding machine at its open side which makes it possible to accurately set a die open-side stop position without using restricting means such as a mechanical stopper and a position setting device.

Another object of the present invention is to provide an improved clamping apparatus in which a die open-side stop position can be accurately set without using restricting means such as a mechanical stopper and a position setting device.

A method according to the present invention is applied to an injection molding machine which is provided with a die clamping apparatus for effecting die closing, die clamping, and die opening, and is used for stopping a movable die of the injection molding machine at its open side.

For programmed control of die opening, in addition to a die open-side stop position, a die opening operation stop position is set at a position offset by a preset amount from the die open-side stop position in a clamping direction. A deceleration start position is also set at a position offset by a preset amount from the die opening operation stop position in the clamping direction.

When the movable die reaches the deceleration start position, the setting value of die opening speed is lowered. When the movable die reaches the die opening operation stop position, the operation for die opening is stopped so as to stop the movable die. The die opening operation stop position is changed in accordance with the difference between the actual stop position of the movable die and the die open-side stop position. In the method according to the present invention, since the setting value of die opening speed is lowered at the deceleration start position, it is possible to prevent the stop position of the movable die from varying in each molding cycle.

Although the operation for die opening is stopped upon the arrival of the movable die at the die opening operation stop position, the movement of the movable die continues due to the inertia of the movable parts of the die clamping apparatus so that the movable die stops at the die open-side stop position or at a position near the die open-side stop position.

When the actual stop position of the movable die differs from the die open-side stop position, the die opening operation stop position is changed in accordance with the difference between the actual stop position of the movable die and the die open-side stop position. Accordingly, the stop position of the movable die in the next operational cycle can be made closer to the die open-side stop position.

In another form of a method according to the present invention, a die open limit position is also set at a position offset by a preset amount from the die open-side stop position in the direction of die opening. In this case, the movable die can be further retracted from the die open-side stop position so that the movable die is opened more. Accordingly, inspection and cleaning of the dies can be performed effectively.

In still another form of a method according to the present invention, the setting value of die opening speed is varied during the movement from the deceleration start position to the die opening operation stop position. In this case, the setting value of die opening speed can be gradually reduced during the movement from the deceleration start position to the die opening operation stop position. Accordingly, the speed of the movable die, which has been close to its maximum speed, is not reduced abruptly, so that the generation of shocks, vibrations, noise, etc. in the die clamping apparatus can be prevented.

A die clamping apparatus according to the present invention comprises a stationary platen, a movable platen disposed facing the movable platen, a die clamping mechanism for advancing and retracting the movable platen so as to effect die closing, die clamping and die opening, a die clamping cylinder connected to the die clamping mechanism, a solenoid proportional direction control valve for switching the operation for die closing, die clamping and die opening by selectively supplying working fluid to fluid chambers of the die clamping cylinder and for controlling the setting value of die opening speed, a stroke sensor for detecting the position of the movable die, a control unit for controlling the solenoid proportional direction control valve in accordance with the position of the movable die, and a setting device.

The setting device is used to set a die open-side stop position, a die opening operation stop position which is offset by a preset amount from the die open-side stop position in a clamping direction, and a deceleration start position which is offset by a preset amount from the die opening operation stop position in the clamping direction.

The control unit reduces the setting value of die opening speed when the movable die reaches the deceleration start position, stops the operation for die opening so as to stop the movable die when the movable die reaches the die opening operation stop position, and changes the die opening operation stop position in accordance with a difference between an actual stop position of the movable die and the die open-side stop position.

Since the value of the die opening speed is lowered at the deceleration start position, it is possible to prevent the stop position of the movable die from varying in each molding cycle.

Although the operation for die opening is stopped upon the arrival of the movable die at the die opening operation stop position, the movement of the movable die continues due to the inertia of the movable parts of the die clamping apparatus so that the movable die stops at the die open-side stop position or at a position near the die open-side stop position.

When the actual stop position of the movable die differs from the die open-side stop position, the die opening operation stop position is changed in accordance with the difference between the actual stop position of the movable die and the die open-side stop position. Accordingly, the stop position of the movable die in the next operational cycle can be made closer to the die open-side stop position.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 5 is a time chart showing the operation of the die clamping apparatus according to the embodiment of the present invention; and FIG. 6 is an explanatory chart according to the embodiment of the present invention showing positions through which the movable die is moved during die opening.

DESCRIPTION OF PREFERRED EMBODIMENT

The present invention will now be described by way of a preferred embodiment in connection with the accompanying drawings.

Figure 1:
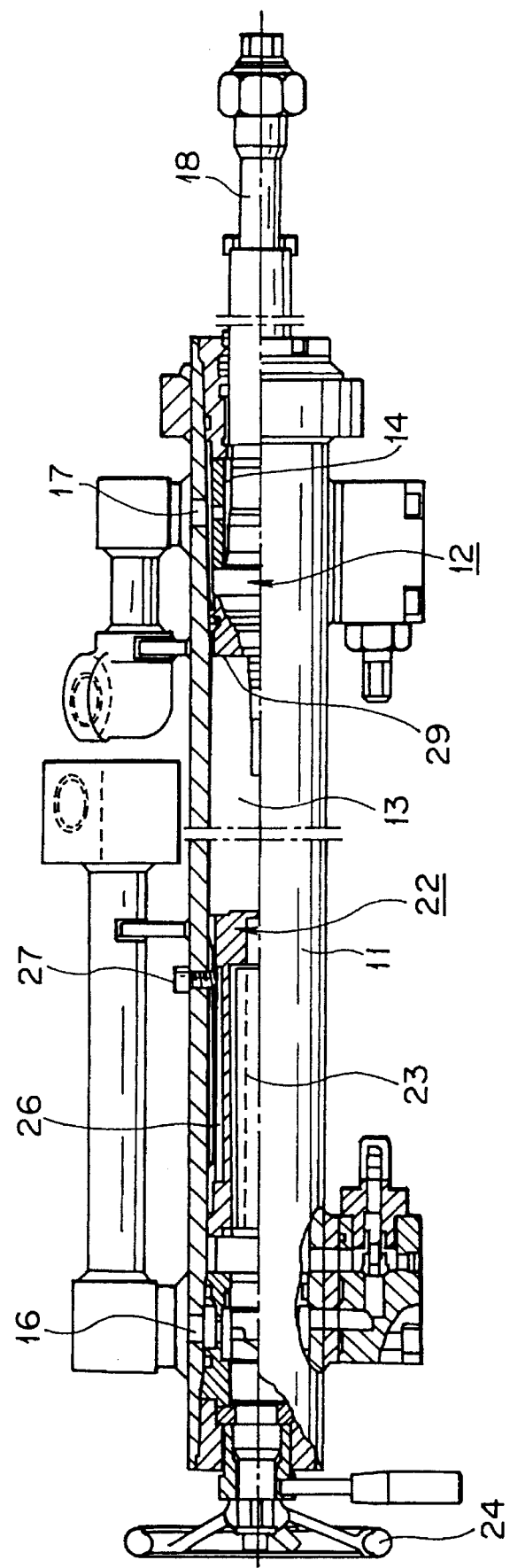
FIG. 1 is a sectional view of a conventional die clamping cylinder.
Figure 2:
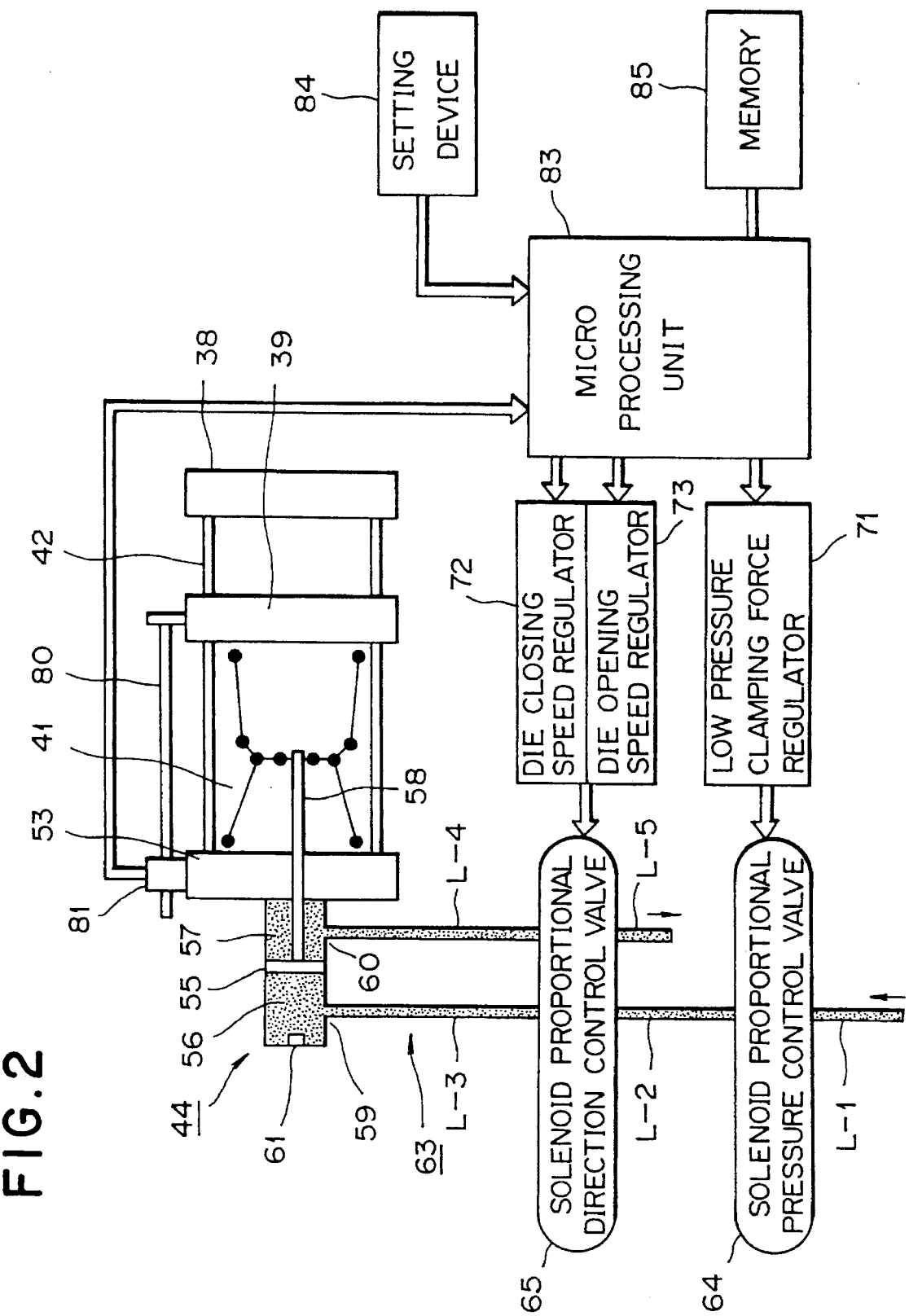
FIG. 2 is a control block diagram of an injection molding machine according to an embodiment of the present invention.
Figure 3:
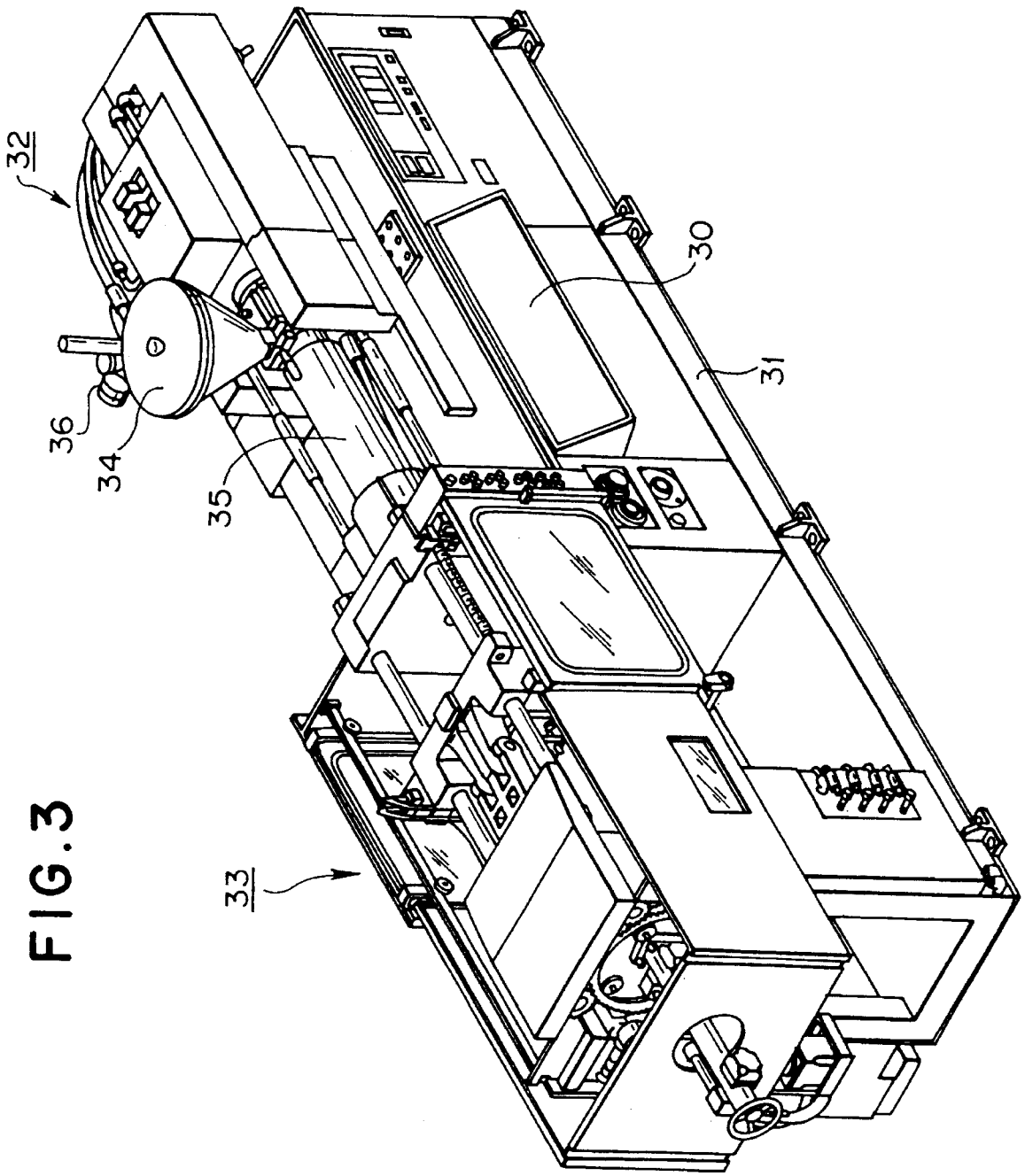
FIG. 3 is a perspective view of the injection molding machine according to the embodiment of the present invention.
Figure 4:
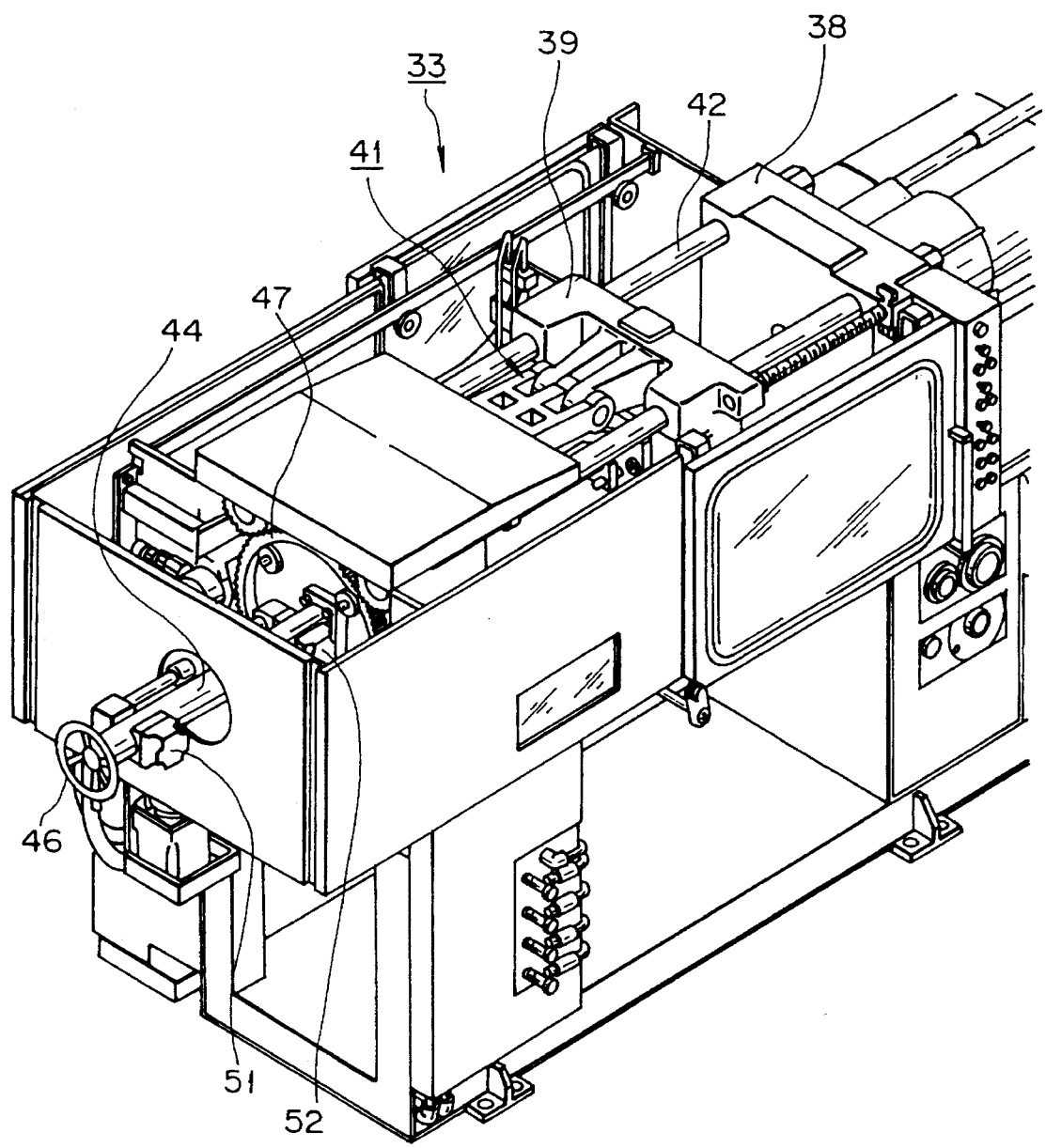
FIG. 4 is a perspective view of the die clamping apparatus of the injection molding machine according to the embodiment of the present invention.

FIG. 2 is a control block diagram of an injection molding machine according to an embodiment of the present invention, FIG. 3 is a perspective view of the injection molding machine, and FIG. 4 is a perspective view of the die clamping apparatus of the injection molding machine.

As shown in FIG. 3, a plasticizing apparatus 32, a die clamping apparatus 33, and a control unit 30 are disposed on a frame 31. The plasticizing apparatus 32 comprises a hopper 34 for supplying a resin, a heating cylinder 35 for melting the resin supplied by the hopper 34, a drive unit 36 for reciprocating and rotating an unillustrated screw in the heating cylinder 35.

As shown in FIG. 4, the die clamping apparatus 33 comprises a stationary platen 38, a movable platen 39 which is disposed to face the stationary platen 38, and a toggle mechanism 21 which is disposed between the movable platen 39 and an unillustrated toggle support and acts as a die clamping mechanism. The movable platen 39 is slidably guided by tie bars 42 disposed between the stationary platen 38 and the toggle support, and is advanced and retracted by the toggle mechanism 41 for die closing, die clamping and die opening.

In order to operate the toggle mechanism 41, there is provide a die clamping cylinder 44 which comprises an unillustrated piston. The stroke of the piston is adjusted by rotating a handle 46. The distance between the platens and the clamping force are adjusted by a clamping force adjusting apparatus 27. Moreover, a cushion adjusting valve 51 for die opening is disposed at the rear end of the die clamping cylinder 44, while a cushion adjusting valve 52 for die clamping is disposed at the forward end of the die clamping cylinder 44. With this arrangement, the piston is prevented from hitting the end walls of the die clamping cylinder 44 during die opening and die clamping.

Next, the operation of the die clamping apparatus 33 will be described.

As shown in FIG. 2, the movable platen 39 is disposed for movement along the tie bars 42 arranged between the stationary platen 38 and the toggle support 53, and is advanced and retracted by the toggle mechanism 41 for die closing, die clamping, and die opening. Moreover, the die clamping cylinder 44 is disposed to operate the toggle mechanism 41.

The tubular die clamping cylinder 44 comprise a slidable piston 55 so that a pair of fluid chambers 56 and 57 are formed on the rear and front sides (the left and right sides as viewed in FIG. 2) of the piston 55. The fluid chambers 56 and 57 are provided with respective ports 59 and 60 through which working fluid is supplied to the fluid chambers 56 and 57. Also, a piston rod 58 is integrally formed with the piston 55, and the toggle mechanism 41 is connected to the piston rod 58.

Accordingly, when the piston 55 is advanced (to the right in FIG. 2) by supplying working fluid to the fluid chamber 56 through the port 59, the toggle mechanism 41 is operated so that the movable platen 39 is advanced for die closing and die clamping. Also, when the piston 55 is retracted (to the left in FIG. 2) by supplying working fluid to the fluid chamber 57 through the port 60, the toggle mechanism 41 is operated so that the movable platen 39 is retracted for die opening. Moreover, a mechanical stopper 61 is disposed in the fluid chamber 56 to restrict the movement of the piston 55, and to set a die open limit position.

A hydraulic circuit 63 is provided to supply the fluid chambers 56 and 57 with working fluid. The hydraulic circuit 63 is composed of an unillustrated fluid source such as a pump and an accumulator, a fluid path L-1 connected to the fluid source, a solenoid proportional pressure control valve 64 disposed in the fluid path L-1 for controlling the pressure of working fluid from the fluid source, a fluid path L-2 for supplying the working fluid whose pressure has been adjusted by the solenoid proportional pressure control valve 64, a solenoid proportional direction control valve 65 connected to the fluid path L-2, a fluid path L-3 for connecting the solenoid proportional direction control valve 65 to the fluid chamber 56, a fluid path L-4 for connecting the solenoid proportional direction control valve 65 to the fluid chamber 57, and a fluid path L-5 connecting the solenoid proportional direction control valve 65 to an unillustrated tank.

The working fluid from the fluid source is supplied to the solenoid proportional direction control valve 65 after its pressure has been adjusted by the solenoid proportional pressure control valve 62. When the solenoid proportional direction control valve 65 connects the fluid path L-2 to the fluid path L-3 and connects the fluid path L-4 to the fluid path L-5, the working fluid having a regulated pressure is supplied to the fluid chamber 56 via the fluid chamber L-3. At this time, the working fluid in the fluid chamber 57 is drained to the tank through the fluid path L-4. When the solenoid proportional direction control valve 65 connects the fluid path L-2 to the fluid path L-4 and connects the fluid path L-3 to the fluid path L-5, the working fluid having a regulated pressure is supplied to the fluid chamber 57 via the fluid chamber L-4. At this time, the working fluid in the fluid chamber 56 is drained to the tank through the fluid path L-3.

The opening of the solenoid proportional pressure control valve 64 is adjusted by a low pressure clamping force regulator 71, while the position and opening of the solenoid proportional direction control valve 65 are switched and controlled by a die closing speed regulator 72 and a die opening speed regulator 73. In detail, the die closing speed is controlled by adjusting the amount of working fluid supplied to the fluid chamber 56 through the fluid path L-3, while the die opening speed is controlled by adjusting the amount of working fluid supplied to the fluid chamber 57 through the fluid path L-4.

Moreover, a stroke sensor 81 is disposed on the toggle support 53 for detecting the position of the movable die. The stroke sensor 81 monitors the movement of a rod 80 fixed to the movable platen 39.

The positional signal output from the stroke sensor 81 is fed to a micro processing unit 83. A setting device 84 and a memory 85 are also connected to the micro processing unit 83. Positions of the movable die during die closing and die opening, a die closing speed, a die opening speed, and a clamping force, etc., are set with the setting device 84.

Next, the operation of the die clamping apparatus 33 having the above-described structure will be described with reference to FIGS. 5 and 6.

FIG. 5 is a time chart showing the operation of the die clamping apparatus shown in FIG. 4, and FIG. 6 is an explanatory chart showing the positions through which the movable die is moved during die opening. In FIG. 5, the axis of abscissa represents time, while the axis of ordinate represents the position of the movable die.

The micro processing unit 83 (shown in FIG. 2) reads out the values set by the setting device 84, and controls the position of the movable die during die closing and die opening, the die closing speed, the die opening speed, and the clamping force, and the like. When the movable die is opened in accordance with a die opening program, a die open-side stop position S16 is set to be short of the die open limit position Smax set by the mechanical stopper 61, i.e., is set at a position offset by a predetermined amount from the die open limit position Smax in the direction of die closing. The movable die is controlled to stop at the die open-side stop position S16.

A die opening operation stop position S15 is set at a position offset by a predetermined distance X (mm) from the die-open side stop position S16 in the direction of die clamping. When it is detected by the stroke sensor 81 that the movable die reaches the die opening operation stop position S15, the micro processing unit 83 sends signals to the die closing speed regulator 72 and the die opening speed regulator 73 to change the position of the solenoid proportional direction control valve 65 to its neutral position so that the operation of the toggle mechanism 41 for die opening is stopped.

Although the operation of the toggle mechanism 41 for die opening is stopped, the movement of the movable die continues due to the inertia of the movable platen 39, the movable die, the toggle mechanism 41 and the like so that the movable die stops at a position which may differ from the die open-side stop position. The micro processing unit 83 detects the actual stop position of the movable die. When the actual stop position is located on the far side of the die open-side stop position S16, i.e., is offset from the die open-side stop position S16 in the direction of die opening, by an amount α (mm), the die opening operation stop position S15 is shifted in the direction of die closing by the amount α (mm). This compensation is performed by adding the amount α (mm) to the distance X (mm). On the other hand, when the actual stop position is short of the die open-side stop position S16, i.e., is offset from the die open-side stop position S16 in the direction of die closing, by an amount α (mm), the die opening operation stop position S15 is shifted in the direction of die opening by the amount α (mm). In other words, the amount α (mm) is subtracted from the distance X (mm). Accordingly, the stop position can be made closer to the die open-side stop position S16.

In this case, even when the piston 55 of the die clamping cylinder 44 is linearly moved, the position of the movable die does not linearly change because the die clamping apparatus 33 is a toggle type. Accordingly, when the die opening operation stop position S15 is shifted by adding or subtracting the amount α (mm) to or from the distance X (mm), the amount α (mm) is not used as is. In detail, the amount α (mm) is divided by 2 or is subjected to a certain calculation, 1 and then added to or subtracted from the distance X (mm). As a result, hunting of the control can be prevented.

When the operation for die opening is stopped at the die opening operation stop position S15 in the state where the setting value of die opening speed is maintained high, the movable die may overrun due to the inertia of the movable parts of the die clamping apparatus 33, i.e., the movable platen 39, the movable die, the toggle mechanism 41, etc. In such a case, the stop position varies in each molding cycle. Accordingly, the setting value of die opening speed is sufficiently decreased before the movable die reaches the die opening operation stop position S15. For this purpose, a deceleration start position S13 is set at a position offset by a predetermined distance Y (mm) from the die opening operation stop position S15 in the direction of die clamping. The movable die is decelerated when the movable die reaches the deceleration start position S13 so that the die opening speed becomes a first setting value of die opening speed V13.

In this case, if the die opening speed which was close to the maximum speed is abruptly reduced at the deceleration start position S13, shocks, vibrations, noise, and the like are generated in the die clamping apparatus 33. Accordingly, a deceleration speed change position S14 is set at a position offset by a predetermined distance Z (mm) from the deceleration start position S13 in the direction of die opening. When the movable die reaches the deceleration speed change position S14, the die closing speed is decelerated to a second setting value of die opening speed V14 lower than the first setting value of die opening speed V13.

By decelerating the movable die in two steps as described above, the generation of shocks, vibrations, noise, and the like in the die clamping apparatus 33 can be prevented.

In the above-described embodiment, the setting value of die opening speed is reduced in two steps by using the first setting value of die opening speed V13 and the second setting value of die opening speed V14. However, the die opening speed may be stepwise decelerated in steps more than two, or continuously and gradually decreased, during the period from the deceleration start position S13 to the die opening operation stop position S15.

In the die clamping apparatus having the above-described structure, an ordinary control for die opening is performed to move the movable die from the die clamp-side end toward the die open-side end until the movable die reaches the deceleration start position S13. When the movable die reaches the deceleration start position S13, a stop control for die open-side is started. In detail, the deceleration of the movable die is started so that the die opening speed is decreased to the first setting value of die opening speed V13.

Subsequently, when the movable die reaches the deceleration speed change position S14, the die opening speed is reduced to the second setting value of die opening speed V14 for further deceleration.

When the movable die reaches the die opening operation stop position S15, the operation of the toggle mechanism 41 for die opening is stopped so that the movable die stops at the die open-side stop position S16.

As described above, by setting various values such as positions of the movable die during die closing and die opening, a die closing speed, a die opening speed and a clamping force with the setting device 84, it is possible not only to accurately stop the movable die at the die open-side stop position S16 but also to easily set the stroke of the movable die. In addition, since the die open-side stop position S16 can be easily set in the case where the dies are exchanged, or the positions of the dies are adjusted with respect to device for taking out a molded product, the time required for exchanging the dies can be shortened. In addition, this facilitates the automatic exchange of the dies.

Moreover, since the die open limit position Smax can be set on the far side of the die open-side stop position S16, inspection and cleaning of the dies can be effectively performed by moving the movable die to the die open limit position Smax.

Obviously, numerous modifications and variations of the present invention are possible in light of the above teachings. It is therefore to be understood that within the scope of the appended claims, the present invention may be practiced otherwise than as specifically described herein.

What is claimed is:

1. A method of stopping a movable die of an injection molding machine at the end of die opening, said method comprising the steps of:

(a) setting a die open-side stop position;

(b) setting a die opening operation stop position at a position offset by a preset amount from said die open-side stop position in a clamping direction;

(c) setting a deceleration start position at a position offset, by a preset amount from said die opening operation stop position in the clamping direction;

(d) decreasing a setting value of die opening speed when the movable die reaches said deceleration start position;

(e) stopping the operation for die opening so as to stop the movable die when the movable die reaches said die opening operation stop position;

(f) determining an actual stop position of the movable die; and (g) changing said die opening operation stop position in accordance with a difference between said actual stop position of the movable die and said die open-side stop position.

2. A method of stopping a movable die of an injection molding machine at the end of die opening according to claim 1, wherein said a die open limit position is also set at a position offset by a preset amount from said die open-side stop position in the direction of die opening.

3. A method of stopping a movable die of an injection molding machine at the end of die opening according to claim 1, wherein the setting value of die opening speed is changed during a period in which said movable die moves from said deceleration start position to said die opening operation stop position.

* * * * *